Figure 1:
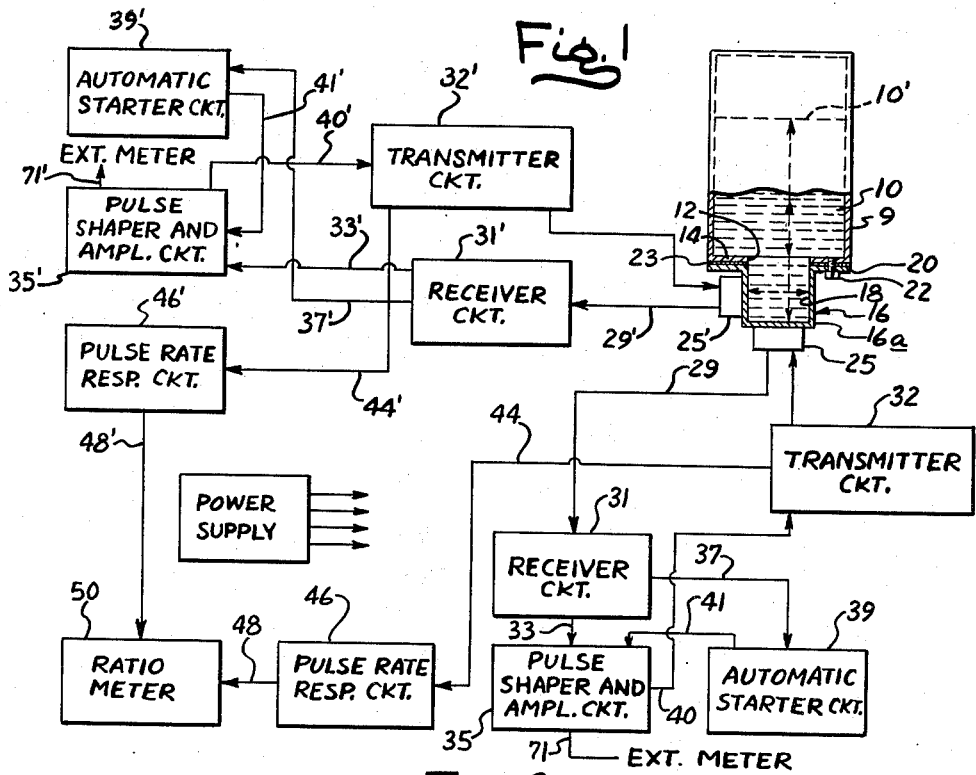

Aug. 13, 1963

W. WELKOWITZ ETAL 3,100,885

ULTRASONIC LIQUID LEVEL GAUGE

Filed Aug. 14, 1961

3 Sheets-Sheet 1

INVENTORS
WALTER WELKOWITZ
HUGO E. DAHLKE
BY
ATTYS.

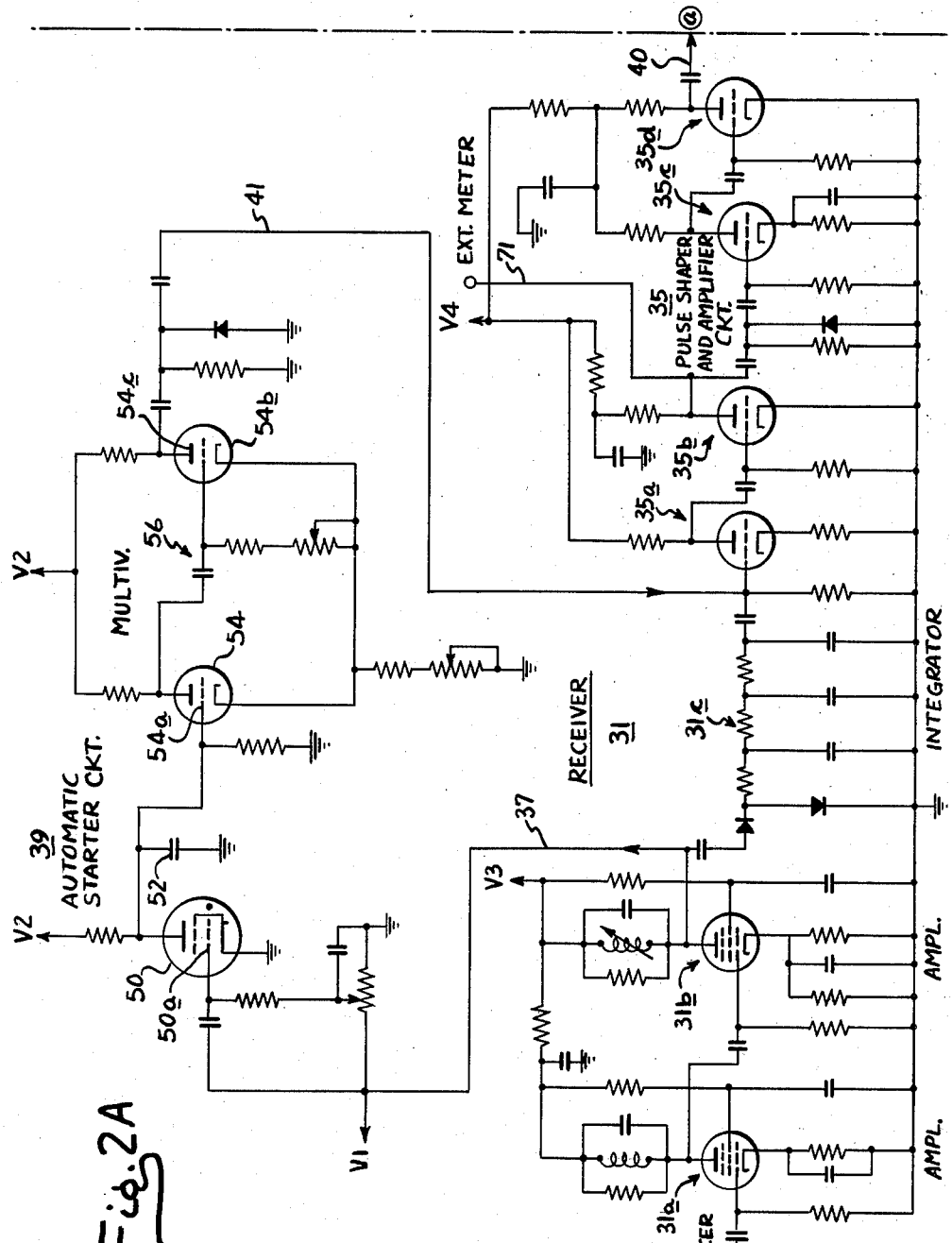

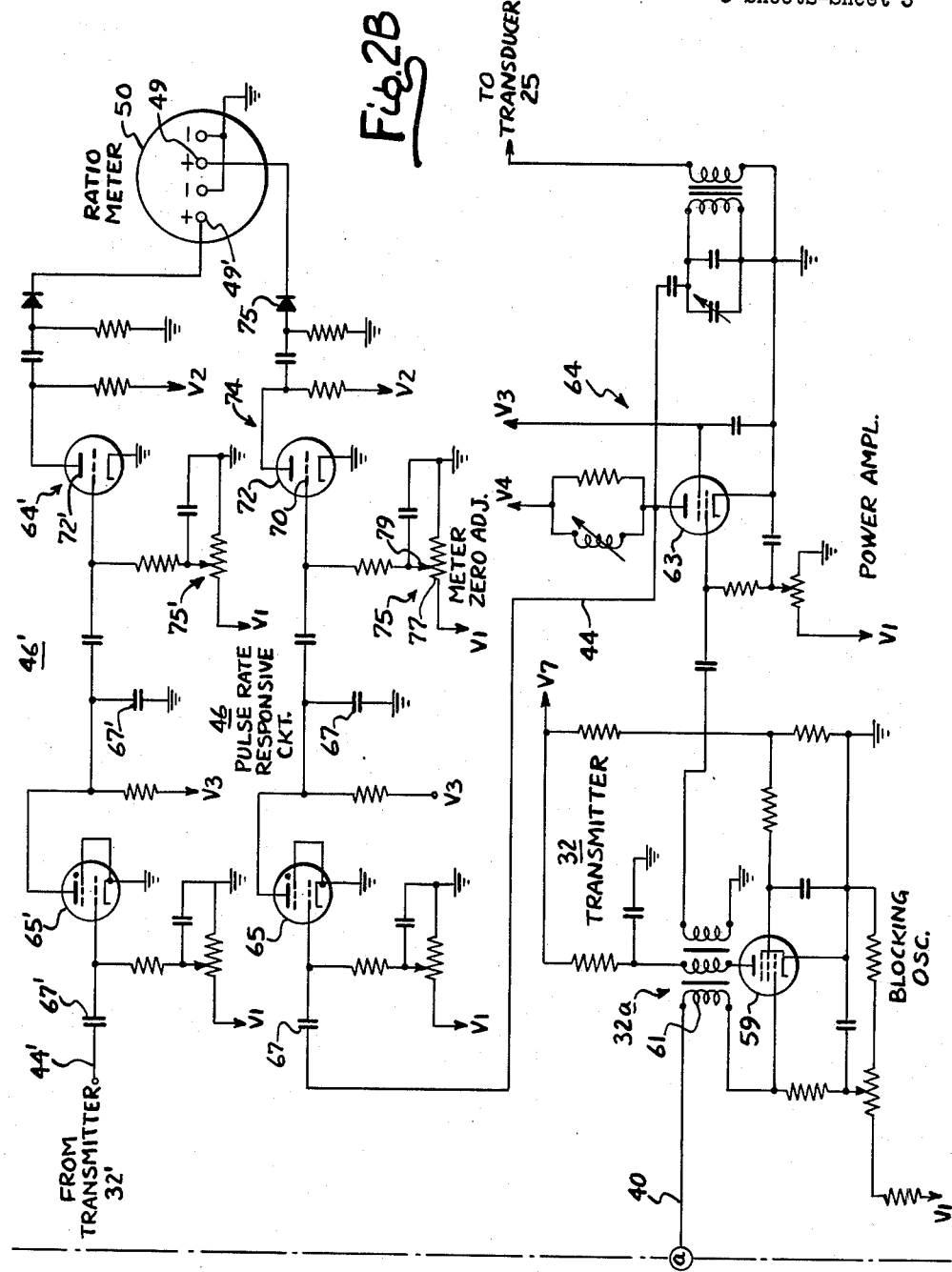

United States Patent Office 3,100,885
Patented Aug. 13, 1963

3,100,885
ULTRASONIC LIQUID LEVEL GAUGE
Walter Welkowitz, Nixon, N.J., and Hugo E. Dahlke, Jenkintown, Pa., assignors to Gulton Industries, Inc., Metuchen, N.J., a corporation of New Jersey
Filed Aug. 14, 1961, Ser. No. 131,261
8 Claims. (Cl. 340—3)

This application is a continuation-in-part of application Serial No. 653,675, filed April 18, 1957, now abandoned, on an Ultrasonic Liquid Level Gauge.

Our invention relates to ultrasonic liquid level gauges and in particular to such gauges which display an indication of liquid level which is independent of the variations in the velocity of ultrasound in the medium.

There have been previously proposed methods and devices for measuring liquid level by use of ultrasonic waves generated in the liquid medium involved toward the top of the body of liquid, where it is reflected forming a wave returning to the point of transmission. The level of the liquid is a function of the time it takes the ultrasonic wave to traverse the variable path involved. Two inherent defects in these systems have been apparent; first, the accuracy of some of them depended upon the maintenance of a fixed liquid temperature and density; and second, those systems which did have means for correcting for the variations in liquid temperature and/or density, were complex and difficult to adjust and calibrate.

Accordingly, it is a principal object of our invention to provide an ultrasonic level gauge which is provided with improved means for making automatic corrections for variations in the characteristics of the liquid medium involved.

It is a further object of our invention to provide such a gauge which can be readily connected into operative relation with any one of a number of conventional liquid containers or tanks requiring only minor modifications to be used with the gauge.

In accordance with one aspect of the present invention, two ultrasonic pulse generating systems are mounted within the body of liquid whose level is to be measured. One of these systems is like the one described above wherein an ultrasonic wave is reflected off the top of the body of liquid involved so that the wave traverses a variable path length depending upon the level of the liquid. A signal is generated which is a function of the time it takes the wave to traverse this variable path length. This is most advantageously obtained by a driving circuit which utilizes the received echo wave reflected from the top of the liquid to initiate the generation of the next ultrasonic wave pulsation so that the pulse repetition rate of the signals generated toward the top of the liquid is a measure of the variable path length traversed by the ultrasonic wave. This repetition rate is also affected by the characteristics of the liquid which determine the velocity of propagation of the ultrasonic wave, such as density.

The second ultrasonic pulse generating system in the body of liquid is one which generates an ultrasonic pulsation over a fixed path length so that the time required for the wave to traverse the fixed path is a function solely of the characteristics of the liquid. A correction signal is developed which is a function of the time it takes the latter ultrasonic pulsation to traverse the fixed path length. This signal is generated in the same manner as that described above wherein the pulse repetition rate of the second ultrasonic pulse generating system is a function of the time it takes the ultrasonic pulsation to traverse the fixed path length. The provision of such a correction signal ultrasonic generating system in a flow meter is not new, but it was not previously thought to be useful or desirable in liquid level indicating apparatus. Also, the manner in which the correction signal is utilized or handled in the present invention is quite different from the manner in which the correction signals were utilized in the aforementioned flow measuring system. Thus, in the liquid level measuring apparatus of the present invention, the liquid level indicating signal and the correction signal is fed to a ratio meter which provides an indication proportional to the ratio of these two signals.

In accordance with still another aspect of the present invention, the two ultrasonic pulse generating systems are mounted in a common housing which can be readily attached to a tank which is to contain the liquid whose level is to be measured. The housing has a liquid-receiving chamber therein which opens onto the top of the housing. A central opening is provided in the bottom wall of the tank which may be about the size of the opening in the top of the housing, and the housing is secured to the tank by screws or the like threading into the bottom wall of the tank, so that the opening in the top of the housing is opposite the opening formed in the bottom of the tank and the chamber in the housing forms a water-tight extension of the tank interior. A first transmitting-receiving ultrasonic wave transducer is mounted adjacent the bottom of the housing chamber to direct ultrasonic waves upwardly through the aligned openings in the housing and tank to the top of the liquid involved, and to receive the reflected echo wave therefrom. A second transmitting-receiving ultrasonic wave transducer is mounted in the side of the housing to direct ultrasonic waves horizontally across the housing chamber where it is reflected from the opposite side thereof. This obviously provides a fixed path length for generating the correction signal referred to above.

Figure 2:
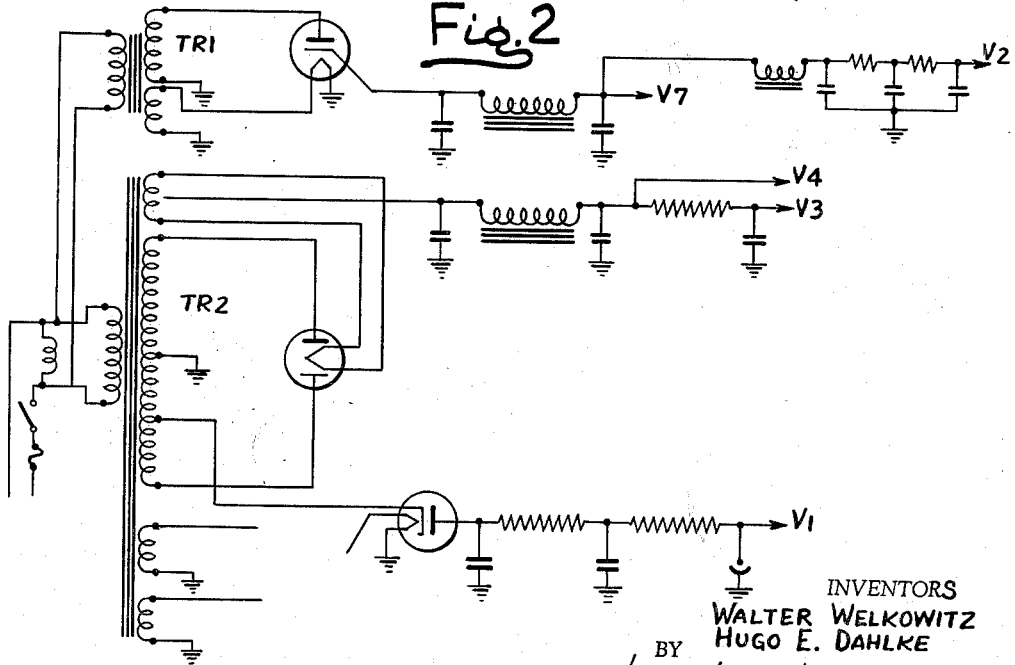

Other objects, advantages and features of the invention will become apparent upon making reference to the specification to follow, the claims and the drawings wherein:

FIG. 1 is a block diagram of a preferred embodiment of the present invention; and FIGS. 2, 2A and 2B considered together form an exemplary schematic diagram of a measuring system corresponding to the block diagram of FIG. 1.

Referring now more particularly to the block diagram of FIG. 1, there is shown a tank 9 in which it is desired to measure the level 10' of a liquid 10 contained therein. To enable the tank 9 to accommodate the liquid level measuring apparatus of the present invention, a circular opening 12 is cut in the central portion of the bottom wall 14 thereof. A transducer housing unit generally indicated by reference numeral 16 is attached to the bottom wall 14 of the tank 9 in any suitable way. As illustrated, the transducer housing unit 16 has a central cylindrical portion 16a defining a chamber 18 therein. The chamber 18 opens onto the top of the housing unit and is in registry with the opening 12 in the bottom of the tank 9. A peripheral flange 20 extends outwardly from the top of the housing unit and has openings for receiving securing screws 22 or the like which thread into correspondingly located threaded openings formed in the bottom wall 14 of the tank 9. A rubber gasket ring 23 is sandwiched between the flange 20 and the bottom tank wall 14 to ensure a water-tight joint therebetween.

An ultrasonic wave transmitting-receiving transducer unit 25 is mounted on the bottom of the chamber-forming portion 16a of the housing unit and when energized, transmits an ultrasonic wave upwardly through the chamber 18 toward the top of the body of liquid 10 in the tank 9. The transmitted wave is reflected off the top 10' of the body of liquid and returns to the transmitting-receiving transducer unit 25. It is apparent that the path length traversed by the ultrasonic wave generated by the transmitting-receiving transducer unit 25 varies with the level of the liquid in the tank 9.

A transmitting-receiving ultrasonic wave transducer unit 25' is mounted on the side of the chamber-forming portion 16a of the transducer housing unit, and, when energized, directs an ultrasonic wave horizontally across the chamber 18. The ultrasonic wave transmitted by the transducer unit 25' is reflected from the far side of the chamber 18 and returns to the transducer unit 25'. The path length traversed by the ultrasonic wave generated by the transducer unit 25' is thus a fixed distance. The time it takes the ultrasonic wave to traverse this path is a function of this fixed distance and of the variable sound velocity determining characteristics of the liquid 10. The time it takes the ultrasonic wave transmitted by the transducer unit 25 to traverse the aforementioned variable path length is a function of the same velocity characteristics of the liquid as well as the variable path length involved.

The ultrasonic signal received by the transducer unit 25 generates an electrical signal on an output line 29 extending to the input of a receiver circuit 31. Similarly, the ultrasonic wave received by the transducer unit 25' generates an electrical signal on an output line 29' extending to a receiver circuit 31'.

In the form of the invention shown in FIG. 1, the receiver circuits 31 and 31' in association with other elements to be described are operative to provide respective triggering pulses upon receipt of echo-indicating signals on the respective lines 29 and 29'. These triggering pulses energize the associated transmitting-receiving transducer units 25 and 25' to initiate new ultrasonic wave pulsations. In the particular form of the invention shown in FIG. 1, the transducer units 25 and 25' are energized through transmitter circuits 32 and 32' to be described.

In FIG. 1, the receiver units 31 and 31' have output lines 33 and 33' respectively extending to the inputs of pulse shaper and amplifier circuits 35 and 35', and output lines 37 and 37' respectively extending to the inputs of automatic starter circuits 39 and 39'. The pulse shaper and amplifier circuits 35 and 35' shape and amplify the output signals of the receiver circuits 31 and 31' and deliver to the inputs of the transmitter circuits 32 and 32' triggering pulses which initiate the generation of energizing pulses for the transducer units 25 and 25'.

The automatic starter circuit means 39 and 39' may take a variety of forms. Each of these circuits has no output as long as it receives a signal from the associated receiver circuit indicating the reception of echo pulsations by the associated transducer unit. However, in the absence of an output in the associated receiver circuit indicating the absence of the receipt of echo pulses from the associated transducer unit, the automatic starter circuit will develop a signal pulse on an output line 41 or 41' which will initiate the transmission of an ultrasonic wave pulsation by the associated transducer unit 25 or 25'. The output lines 41 and 41' respectively extend to pulse shaper and amplifier circuits 35 and 35' to effect the formation of properly shaped triggering pulses fed to the transmitter circuits 32 and 32'. If desired, the automatic starter circuits 39 and 39' could be replaced by manually operable ultrasonic wave generating means (not shown) mounted on the transducer housing unit 16. However, it is preferred to eliminate the necessity for an operator to manually initiate generation of such ultrasonic wave pulsations.

It is apparent that the transducer unit 25 will generate ultrasonic wave pulsations at a pulse repetition rate dependent upon the height of the liquid in the tank 9 and the characteristics of the liquid 10 affecting the velocity of propagation of sound in the liquid 10.

In a similar way, the transmitting-receiving transducer unit 25' generates ultrasonic wave pulsations at a pulse repetition rate which is a function of the fixed path length traversed by the ultrasonic waves transmitted thereby and also of the characteristics of the liquid 10 which affect the velocity of propagation therein.

Signals indicating the pulse repetition rates of the transmitter circuits 32 and 32' are respectively fed to respective pulse rate responsive circuits 46 and 46'. Accordingly, output lines 44 and 44' extend from the transmitter circuits 32 and 32' to the pulse rate responsive circuits 46 and 46'. The latter circuits produce signals on respective output lines 48 and 48' thereof whose amplitudes are proportional to the pulse repetition rates of the transmitter circuits 32 and 32'. Lines 48 and 48' extend to a ratio meter 50 which provide an indication proportional to the ratio of the signals on the lines 48 and 48'. It has been discovered that the incorporation of the correction signals with the liquid level indicating signals in this way produced the desired correction in the most useful way. In this manner, variations in density of the liquid 10 are automatically cancelled out so that accurate liquid level indications are provided which are independent of the nature of the liquid in the tank 9. The ratio meter 50 is calibrated in terms of the particular measuring units desired for indicating the level of the liquid in the tank 9.

It is apparent that some of the elements indicated in block form in FIG. 1 can be combined with other elements, eliminated or interconnected in somewhat different ways to accomplish the results described above. For example, where a signal received by the receiver circuits 31 and 31' have a suitable shape, the pulse shaping functions of the circuits 35 and 35' could obviously be omitted. Also, if needed, the pulse shaping functions could be performed by the receiver circuits 31 and 31'. Moreover, the automatic starter circuits 39 and 39' instead of receiving their input signals from the receiver circuits 31 and 31' could obviously receive these signals from the output of the pulse shaper and amplifier circuits 35 and 35'.

FIGS. 2, 2A and 2B show an overall exemplary circuit diagram for most of the circuits shown in block form in FIG. 1. Only the circuits associated with the transducer unit 25 have been shown, it being understood that the corresponding circuits associated with the transducer unit 25' are the same. As shown in FIG. 2A, the receiver circuit 31 comprises two tuned amplifier stages 31a and 31b, the output of the latter amplifier stage feeding an integration network 31c. The pulse shaper and amplifier circuit 35 as shown comprises a series of cascaded amplifier stages 35a, 35b, 35c and 35d which include various pulse shaping networks as indicated.

The automatic starter circuit 39 shown in FIG. 2A includes a thyratron tube 50 whose control grid 50a is connected by the aforementioned line 37 to the output of the second tuned amplifier stage 31b of the receiver circuit 31. A capacitor 52 is connected in parallel with the plate circuit of the thyratron tube 50, the capacitor 52 charging toward the value of the plate voltage V2 feeding the thyratron tube 50 as long as the latter tube remains non-conductive. The tube 50 is non-conductive before the system initially has been set into operation. The resulting high positive charge appearing on the capacitor 52 is fed to the control grid 54a of a triode tube 54 forming part of a one shot multivibrator pulse generating circuit generally indicated by reference numeral 56. The multivibrator circuit has another triode tube 54b which has a cathode connected in a common cathode circuit with the cathode of the tube 54. Normally, the multivibrator is in a quiescent condition with the tube 54b conducting and the tube 54a in a non-conductive condition. When a large positive voltage appears across capacitor 52, the bias conditions of the circuit are such that the tube 54a becomes conductive and the tube 54b non-conductive. The voltage on the plate 54c of the tube 54 initiates a pulse on the output line 41 connected to the pulse shaper and amplifier circuit 35. This pulse is shaped and amplified in the pulse shaping and amplifier circuit 35 and fed to transmitter circuit 32 via line 40. The transmitter circuit 32 shock excites the transducer unit 25. The resulting ultrasonic wave is reflected back to the transducer unit 25 which feeds a pulse to the input of the tuned amplifier stage 31a. The pulse then appearing in the output of the second amplifier stage 31b is coupled by line 37 to the control grid of the thyratron tube 50 which will fire the tube 50. Conduction of tube 50 prevents the capacitor 52 from charging to the voltage necessary to trigger the multivibrator circuit 56 into operation. The pulse generating multivibrator circuit 56 is thus inhibited from operating.

The transmitter circuit 32 shown in FIG. 2B includes a blocking oscillator circuit 32a which is normally held in an operative state by means of a biasing voltage applied to the control grid of a blocking oscillator tube 59. This biasing voltage is overcome by the feeding of a triggering pulse from the pulse shaper and amplifier circuit 35 to a winding 61 associated with the blocking oscillator circuit. An energizing pulsation is then fed to the control grid of a tube 63 forming part of a power amplifier circuit generally indicated by reference numeral 64. The output of the power amplifier circuit 64 is fed to the transducer unit 25.

The transmitter circuit output line 44 extends between the plate of the tube 63 of the power amplifier circuit 64 and the input of the pulse rate responsive circuit shown in FIG. 2B. The pulse rate responsive circuit 46 as illustrated includes a thyratron tube 65 whose control grid is coupled to a capacitor 67 connected in turn to the line 44. The thyratron tube 65 is in a circuit rendered alternately conductive and non-conductive at the pulse repetition rate of the transmitter 32. A capacitor 67 coupled in parallel with the plate circuit of the thyratron tube 65 alternately charges to a voltage which is a function of the pulse repetition rate of the transmitter 32 when tube 65 is non-conductive, and discharges when the thyratron tube fires. The unidirectional pulsating voltage across the capacitor 67 is coupled to the control grid 70 of a tube 72 forming part of an amplifier circuit generally indicated by reference numeral 74. The output of the amplifier circuit 74 is connected to one of the terminals 49 of the ratio meter 50 through a rectifier 75.

FIG. 2B also illustrates the pulse rate responsive circuit 46' associated with the correction channel of the liquid level measuring apparatus. The pulse rate responsive circuit 46' is substantially identical to the pulse rate responsive circuit 46 just described and, therefore, includes a thyratron tube 65' whose control grid is coupled through a capacitor 67' and line 44' to the output of the transmitter circuit 32' corresponding to the point to which the output line 44 extends. A capacitor 67' is connected in parallel with the plate circuit of the thyratron tube 65' and thereby charges to a voltage which is proportional to the pulse repetition rate of the transmitter circuit 32'. The output of the thyratron circuit is fed to an amplifier stage 64' which feeds a unidirectional pulsating voltage to a second input 49' of the ratio meter 50. As previously explained, the ratio meter 50 provides an indication proportional to the ratio of the unidirectional voltages fed to the input terminals 49 and 49'.

The control grid 70 of the tube 72 is connected to an adjustable biasing circuit generally indicated by reference numeral 75. This circuit includes a potentiometer 77 having a adjustable wiper 79 for varying the negative bias applied to the control grid 70. The wiper 79 is varied in position until the output of the ratio meter 50 reads zero when the liquid in the tank 9 is at the bottom of the tank. The same adjustment can be made by a similar biasing circuit 75', associated with the control grid of tube 72' in the pulse rate responsive circuit 46'.

If desired, instead of utilizing the pulse rate responsive circuits 46 and 46' and the ratio meter 50 shown in FIG. 2B, a Hewlett-Packard digital ratio indicator may be utilized. This ratio meter is capable of providing an indication which is proportional to the ratio of the pulse repetition rates of two signals fed thereto. The connections leading to this ratio meter can be made at any number of points in the circuitry shown. As illustrated, they are made to the amplifier stages 35b (and 35b') forming part of the pulse shaper and amplifier circuits 35 and 35' by external meter connecting lines 71 (and 71'.) The line 71 is shown in FIG. 2A extending to the plate of the tube forming part of the amplifier stage 35b. (The line 71' and amplifier stage 35b' are not actually shown but are identical to the corresponding unprimed elements of FIG. 2A.)

FIG. 2 illustrates an exemplary power supply which can supply the various voltages V1, V2, V3, V4 and V7 required by the circuitry of FIGS. 2A and 2B.

It should be understood that numerous modifications may be made in the preferred forms of the invention above described without deviating from the broader aspects thereof. For example, the correction transducer unit 27 is both a transmitting and a receiving unit. The transmitting and receiving functions could be carried out by separate transducers positioned on opposite sides of the housing unit 16. The expression "vibration wave transmitting and receiving means" used in the claims is intended to cover the combined unit as shown in FIG. 1 or the separated units as just described unless the claim involved specifies otherwise. Also, the insertion of a correction signal into the resultant output of the measuring system as a ratio factor rather than, for example, as a differential factor, has application to other ultrasonic measuring systems, such as flow meters and the like.

What we claim as new and desire to protect by Letters Patent of the United States is:

1. An ultrasonic measuring system for measuring a variable in a medium which is to be independent of the density thereof, said system including an information measuring section including first ultrasonic wave transmitting and receiving means which provide an information signal which is a measure of said variable and the density of said medium, and a correction measuring section including second ultrasonic wave transmitting and receiving means which provide a correction signal of the same kind as said information signal and which is substantially independent of said variable but dependent on said medium density, and means for indicating the value of said variable comprising divider means responsive to said information and correction signals for providing an indication of the ratio of the magnitudes of said signals.

2. A liquid level gauge for measuring the level of liquid in a container comprising: first vibration transmitting and receiving means for transmitting a vibration wave in said container and receiving the same over a fixed path length, second vibration transmitting and receiving means for transmitting a vibration wave upwardly through said container toward the top of the body of liquid therein and receiving the vibration wave reflected from the top thereof, first energizing means for momentarily energizing said first vibration transmitting and receiving means each time a vibration wave pulsation is received thereby so that the pulse repetition rate of the vibration signals generated thereby is a function of said fixed path length and the characteristics of the liquid medium involved, second energizing means for momentarily energizing said second vibration transmitting and receiving means each time a vibration wave pulsation is received so that the pulse repetition rate of the vibration signals generated thereby is a function of a variable path length dependent on the liquid level and the characteristics of the liquid medium involved, and divider means for providing an indication which is a function of the ratio of the pulse repetition rates of the signals generated by said first and second vibration transmitting and receiving means.

3. A liquid level measuring apparatus for connection to a tank having an opening in the bottom thereof, said apparatus comprising a housing having a liquid holding chamber therein opening onto the top of said housing, means for attaching the housing to the bottom of said tank with the housing chamber opening opposite said tank opening and the housing chamber forming a liquid tight extension of the tank interior, first vibration transmitting and receiving means for transmitting a vibration wave pulsation and receiving the same over a fixed path in said chamber, second vibration transmitting and receiving means for transmitting a vibration wave pulsation upwardly through said chamber and tank openings toward the top of the body of liquid therein and receiving the vibration wave reflected from the top of the liquid, the path length traversed by the latter pulsation varying with the liquid level in said tank, first energizing means for momentarily energizing said first vibration transmitting and receiving means each time a vibration wave pulsation is received thereby so that the pulse repetition rate of the vibration signals generated thereby is a function of said fixed path length and the characteristics of the liquid medium involved, second energizing means for momentarily energizing said second vibration transmitting and receiving means each time a vibration wave pulsation is received so that the pulse repetition rate of the vibration signals generated thereby is a function of said variable path length and the characteristics of the liquid medium involved, and means responsive to the pulse repetition rates of the signals generated by both said first and second vibration transmitting and receiving means for providing an indication of liquid level which is independent of the characteristics of the liquid medium.

4. A liquid level measuring apparatus for connection to a tank having an opening in the bottom thereof, said apparatus comprising a housing having a liquid holding chamber therein opening onto the top of said housing, means for attaching the housing to the bottom of said tank with the housing chamber opening opposite said tank opening and the housing chamber forming a liquid tight extension of the tank interior, first vibration transmitting and receiving means on said chamber for transmitting a vibration wave pulsation and receiving the same over a fixed path in said chamber, second vibration transmitting and receiving means at the bottom of said housing chamber for transmitting a vibration wave pulsation upwardly through said chamber and tank openings toward the top of the body of liquid therein and receiving the vibration wave reflected from the top of the liquid, the path length traversed by the latter pulsation varying with the liquid level in said tank, first means for providing a signal which is a measure of the time it takes a vibration pulsation from said first vibration transmitting and receiving means to traverse said fixed path length, second means for generating a signal which is a measure of the time it takes the vibration pulsation generated by said second vibration transmitting and receiving means to traverse said variable path length, and liquid level indicating means responsive to the signals of said first and second means.

5. A liquid level measuring apparatus for connection to a tank having an opening in the bottom thereof, said apparatus comprising a housing having a liquid holding chamber therein opening onto the top of said housing, means for attaching the housing to the bottom of said tank with the housing chamber opening opposite said tank opening and the housing chamber forming a liquid tight extension of the tank interior, first vibration transmitting and receiving means on one side of said housing chamber for transmitting a vibration wave pulsation across said housing chamber and receiving the reflected wave pulsation from the other side wherein the wave pulsation traverses a fixed path length, second vibration transmitting and receiving means at the bottom of said housing chamber for transmitting a vibration wave pulsation upwardly through said chamber and tank openings toward the top of the body of liquid therein and receiving the vibration wave reflected from the top of the liquid, the path length traversed by the latter pulsation varying with the liquid level in said tank, first means for providing a signal which is a measure of the time it takes a vibration pulsation from said first vibration transmitting and receiving means to traverse said fixed path length, second means for generating a signal which is a measure of the time it takes the vibration pulsation generated by said second vibration transmitting and receiving means to traverse said variable path length, and liquid level indicating means responsive to the signals of said first and second means.

6. A liquid level gauge for measuring the level of liquid in a container comprising: first vibration transmitting and receiving means for transmitting a vibration wave in said container and receiving the same over a fixed path length, second vibration transmitting and receiving means for transmitting a vibration wave upwardly through said container toward the top of the body of liquid therein and receiving the vibration wave reflected from the top thereof, first and second energizing means responsive respectively to the receipt of vibration pulsations from said first and second vibration transmitting and receiving means for momentarily effecting the energization of the latter means to initiate the generation of the next vibration pulsations whereby the pulse repetition rates of the vibration transmitting and receiving means is a measure of the time it takes the vibration pulsations to traverse said fixed and variable path lengths, automatic starter means for initially effecting the energization of said vibration transmitting and receiving means, said automatic starter means including automatically operable pulse generator means whose output initiates operation of the vibration transmitting and receiving means, and means responsive to the receipt of vibration pulsations from the vibration transmitting and receiving means for inhibiting the operation of said pulse generating means.

7. A sonic wave measuring system for measuring the distance between a sonic wave transmitting point in a given medium and a reflecting point for waves transmitted in said medium between said point which reflecting point varies in distance from the transmitting point, said measuring system comprising: sonic pulse transmitting means for periodically propagating a sonic pulse between said variably spaced transmitting and reflecting points in said medium and also between fixedly spaced transmitting and receiving points in said medium, first sonic pulse receiving means responsive to the time it takes each sonic pulse to traverse the space between said variably spaced transmitting and reflecting points in said medium by producing a signal having a characteristic whose magnitude is proportional to said time, second sonic pulse receiving means responsive to the time it takes such sonic pulse to traverse the space between said fixedly spaced transmitting and receiving points in said medium by producing a signal having a characteristic whose magnitude is proportional to the latter time, and divider means for providing an indication of the ratio of the magnitude of the characteristics of said signals.

8. The sonic wave measuring system of claim 7 wherein said signal characteristic of each of said signals is the amplitude of the associated signal.

References Cited in the file of this patent

UNITED STATES PATENTS

| | | |
|---|---|---|
| 2,083,344 | Newhouse et al. | June 8, 1937 |
| 2,648,056 | Jakosky | Aug. 4, 1953 |
| 2,753,542 | Rod et al. | July 3, 1956 |
| 2,841,775 | Saunders | July 1, 1958 |
| 2,978,899 | Kritz | Apr. 11, 1961 |